Patented July 3, 1934

1,964,999

UNITED STATES PATENT OFFICE 1,964,999

METHOD FOR RENDERING CHLORO-CARVACROL DERIVATIVES SOLUBLE AND PRODUCT OBTAINED THEREBY

Curt Philipp, Radebeul, near Dresden, Germany, assignor to Chemische Fabrik von Heyden, A. G., Radebeul, near Dresden, Germany, a corporation of Germany No Drawing. Application August 14, 1930, Serial No. 475,390. In Germany April 2, 1928

3 Claims. (Cl. 167—31)

In my application for United States patent, filed on March 8, 1930, under Serial No. 434,442, I have described a process for manufacturing chlorine derivatives of carvacrol, and in my co-pending application No. 434,443, I have described a process for manufacturing carvacrol and derivatives of the same.

I have found that such halogen derivatives of carvacrol, having one of more hydrogen atoms of the benzene ring substituted by halogen, exert a strong bactericidal effect and are capable of destroying the obnoxious forms of inferior life.

I also found, however, that the chloro-derivatives of the carvacrol are relatively difficultly soluble in water so as to be almost ineffective under ordinary conditions and it is the object of the present invention to find a way by which these derivatives can be rendered amenable to a better and quicker action.

This invention relates, therefore, to a method for rendering chloro-derivatives of carvacrol soluble in readily available and low priced solvents and to apply the solutions thus obtained for disinfecting, or preserving, food, containers for food, fruit, glue, glazes and the like articles also for disinfecting hides, skins, wearing apparel, in fact for all kinds of perishable articles made of material or matter, of organic origin.

I have now found that with the solutions, the preparation of which will be apparent from the examples described below, I can safely and conveniently disinfect a great variety of food by acting upon the same, with chlorine derivatives of carvacrols, for instance such as the mono- and di-chlor carvacrol as contained in my solutions. By very extensive experiments I have established that bacteria, carried by food or other articles, are surely killed and I have established for instance that the disinfecting power of mono-chlor carvacrol on staphylococci is 180 times, and that of di-chlor carvacrol is approximately 450 times that of phenol.

A considerable advantage of my new process is that chlorine derivatives of carvacrol, or other halogen derivatives of the same, as offered in my new solutions, may be applied in such an enormous dilution that any harmful effect on the organism is absolutely excluded.

For the better and quicker action of the halogen derivatives of carvacrols I dissolve the same in certain salt solutions, for instance in that of a salt, for instance the sodium salt of carvacroxacetic acid which melts at 149° C., (vide Spica, Gaz. chim. ital. X, page 345), or of sodium benzoate, sodium-toluene-sulfonate of sodium chloride and of solutions of soaps. I have to consider, of course, the nature of the article to be disinfected whether I for instance apply a suspension of a halogen-derivative of carvacrol in water only, or a solution of the same in a salt other than soap, or in soap. It is also occasionally of advantage to combine the halogen carvacrol with a wetting out substance, for instance such as propylnaphthalene sulfonic acid and its salts, and many other similar compounds having the same effect.

From the following examples, the nature of my invention will be better understood.

*Example 1.—Disinfection of food, for instance dill pickles*

The food to be preserved is covered with a wrapping paper impregnated with a halogen derivative, for instance monochlor-carvacrol. The carvacrol is leached out of the paper, travels into the aqueous liquor and exerts then its disinfecting action on the same. Inasmuch as the applied halogen derivatives are difficultly soluble in water, the solution of the halogen derivative is favored by the substances dissolved in the dill pickle liquor, which is essentially a sodium chloride solution.

*Example 2.—Disinfection of cellulose caps*

Caps, made of cellulose hydrate, are used more and more for closing the jars, in which preserved foods, or similarly perishable foods, are stored and inasmuch as these caps are continuously exposed to moisture, they are sterilized before they are used for the cited purpose.

I have found that I can most conveniently preserve these caps by acting on the same with solutions of halogen derivatives of carvacrol and I have found that for instance such a diluted solution of monochlor-carvacrol in the proportion of 1:80,000 gives an excellent and reliable result. Instead of mono-halogen-carvacrol I may use as well halogen products containing two or more atoms of halogen.

What I claim is:

1. As a new article of manufacture a disinfectant, consisting of a chloro-derivative of carvacrol dissolved in a salt solution.

2. As a new article of manufacture a disinfectant, consisting of a chloro-derivative of carvacrol dissolved in a salt solution containing a salt selected from a group comprising the sodium salts of carvacroxacetic acid, benzoic acid, toluene-sulfonic acid, hydrochloric acid, palmitic, stearic, and oleic acid.

3. As a new article of manufacture a disinfectant solution, consisting of a chloro-derivative of carvacrol dissolved in the aqueous solution of the sodium salt of carvacroxacetic acid.

CURT PHILIPP.